(No Model.) F. EGGE. 6 Sheets—Sheet 2.
MACHINE FOR MAKING LACING HOOKS.

No. 473,215. Patented Apr. 19, 1892.

WITNESSES:
J. F. Finch.
S. S. Williamson.

INVENTOR
F. Egge
BY F. W. Smith Jr.
ATTORNEY (No Model.) 6 Sheets—Sheet 3.

F. EGGE.
MACHINE FOR MAKING LACING HOOKS.

No. 473,215. Patented Apr. 19, 1892.

WITNESSES:
J. F. Finch.
S. S. Williamson.

INVENTOR
F. Egge
BY
F. W. Smith Jr.
ATTORNEY (No Model.) 6 Sheets—Sheet 4.
F. EGGE.
MACHINE FOR MAKING LACING HOOKS.
No. 473,215. Patented Apr. 19, 1892.
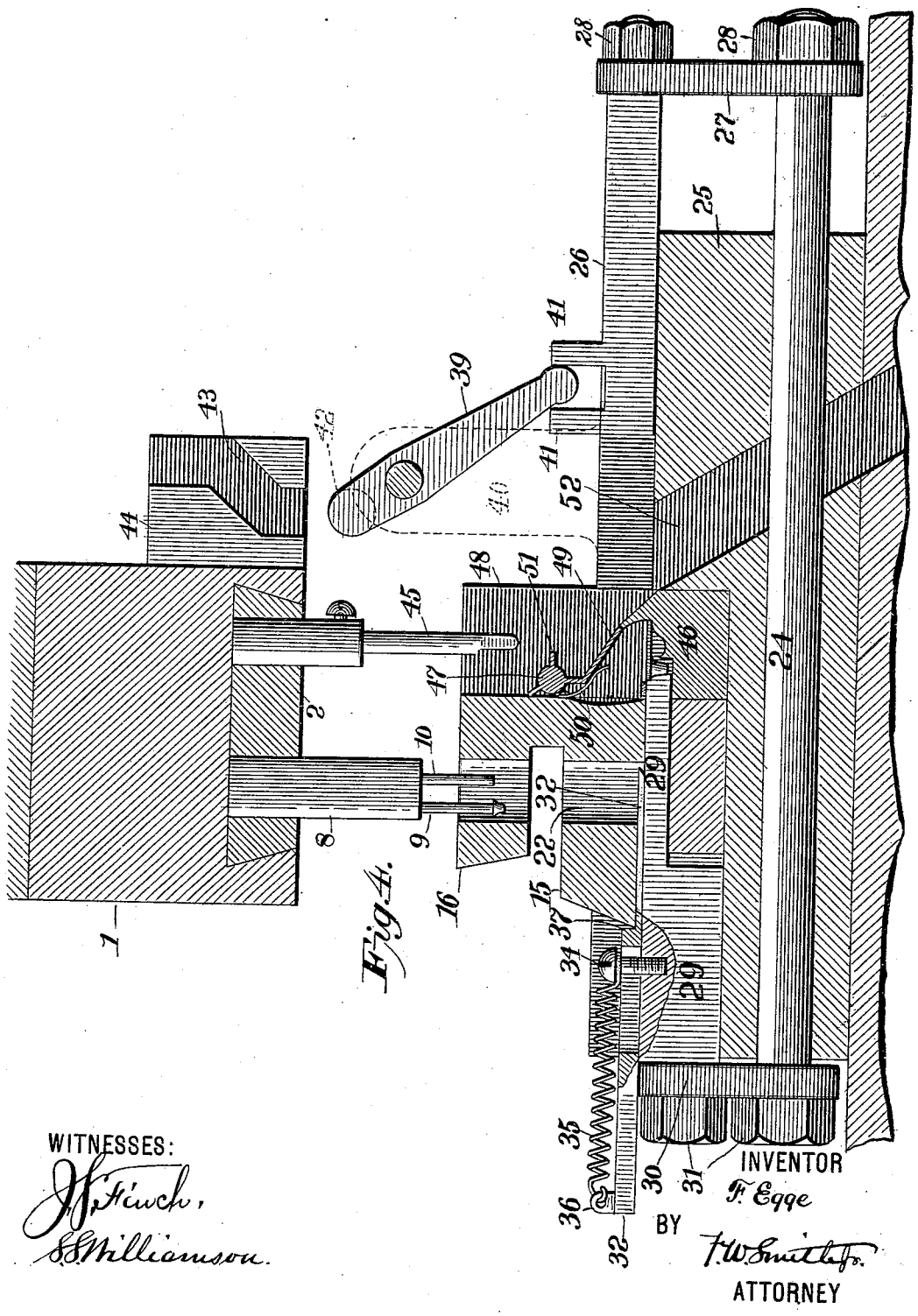
WITNESSES:
JF Finch,
SS Williamson.
INVENTOR
F. Egge
BY
F. W. Smith Jr.
ATTORNEY

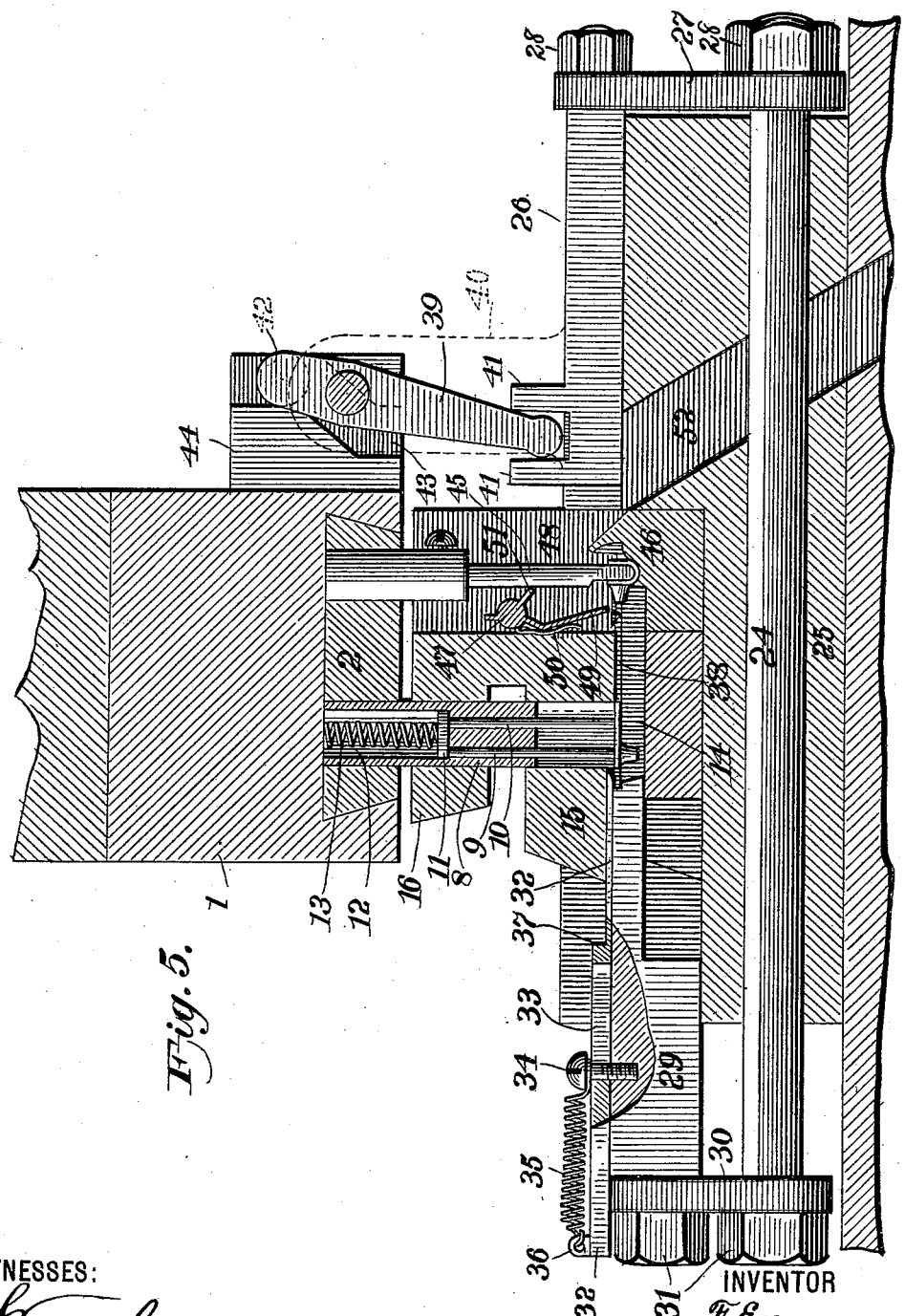

(No Model.) 6 Sheets—Sheet 6.
F. EGGE.
MACHINE FOR MAKING LACING HOOKS.
No. 473,215. Patented Apr. 19, 1892.
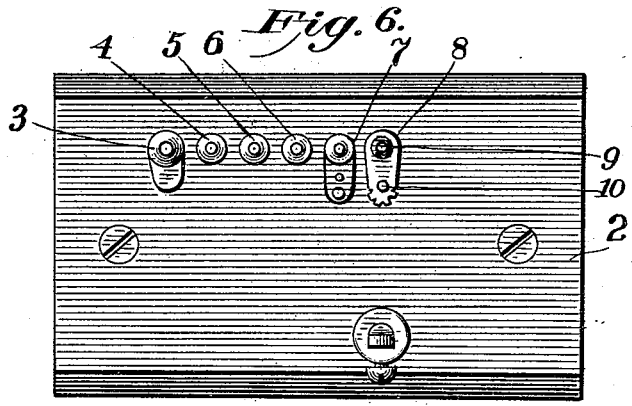
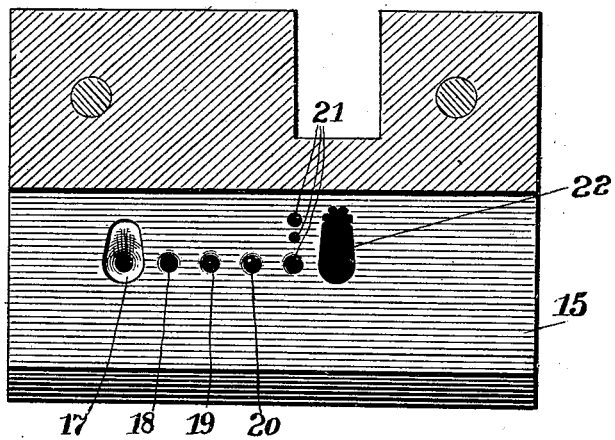
WITNESSES:
J. F. Finch.
J. S. Williamson.
INVENTOR
F. Egge
BY
F. A. Smith Jr.
ATTORNEY

UNITED STATES PATENT OFFICE.

FREDERICK EGGE, OF BRIDGEPORT, CONNECTICUT, ASSIGNOR TO THE SMIDT & PUPKE MANUFACTURING COMPANY, OF NEW YORK, N. Y.

MACHINE FOR MAKING LACING-HOOKS.

SPECIFICATION forming part of Letters Patent No. 473,215, dated April 19, 1892.

Application filed April 30, 1891. Serial No. 391,123. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Making Lacing-Hooks; and I do hereby declare the following to be a full, clear, and exact description of the invention, such as will enable others skilled in the art to which it appertains to make and use the same.

My invention relates to the manufacture of lacing-hooks for shoes, but especially has reference to the manufacture of such hooks from a continuously-fed strip of sheet metal, and will be best understood by reference to the accompanying drawings, in which—

Figure 1:
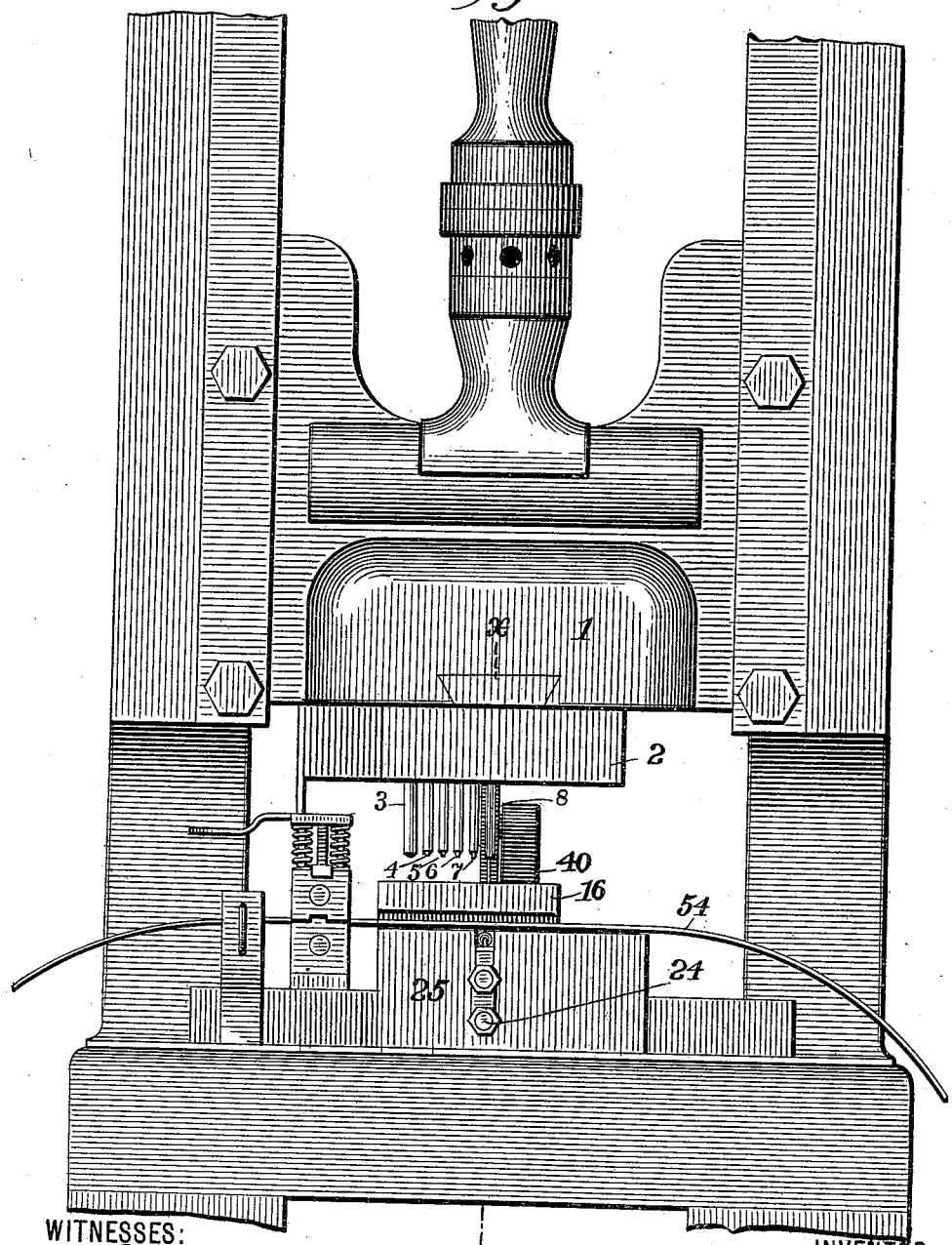
Figure 2:
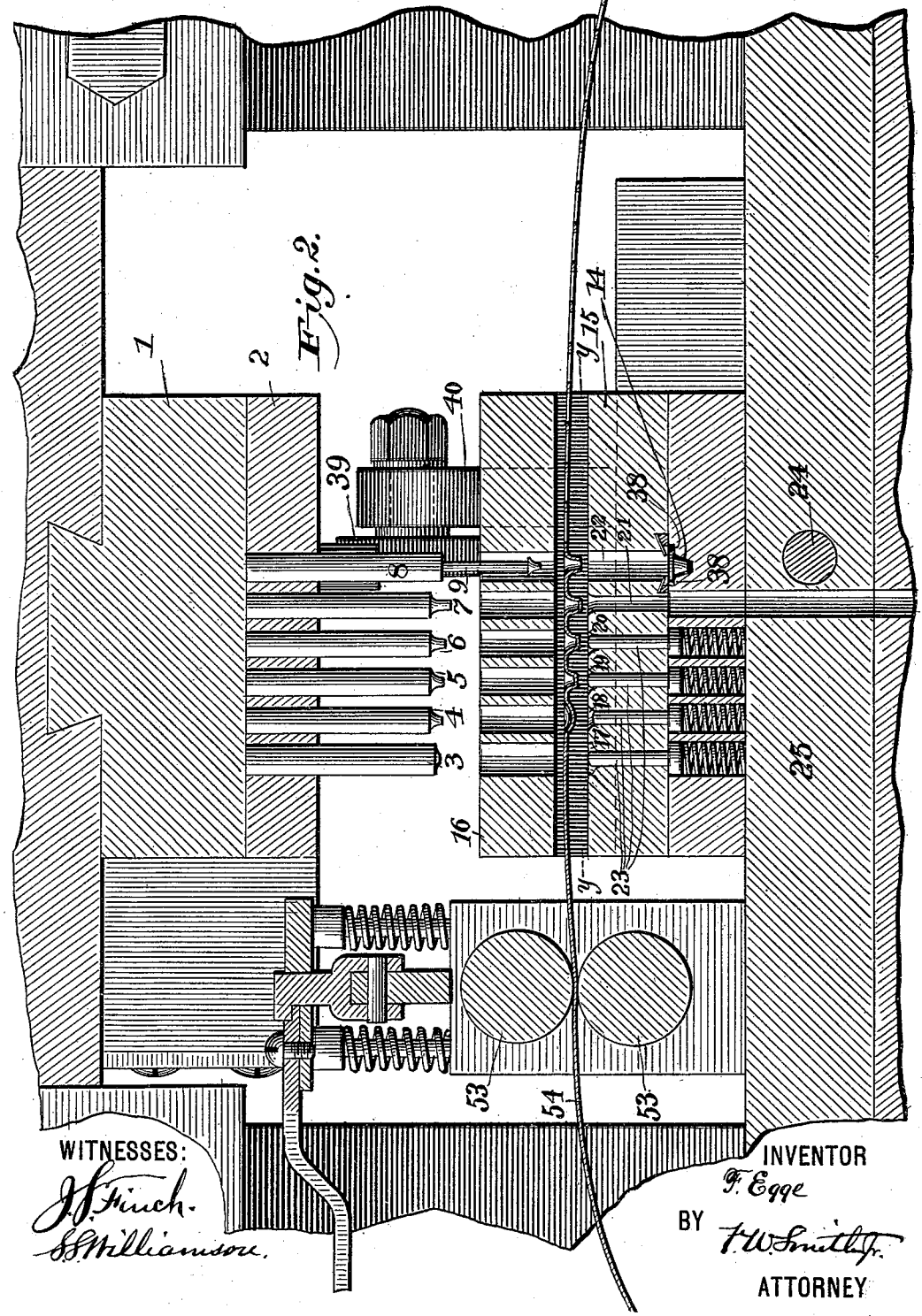
Figure 3:
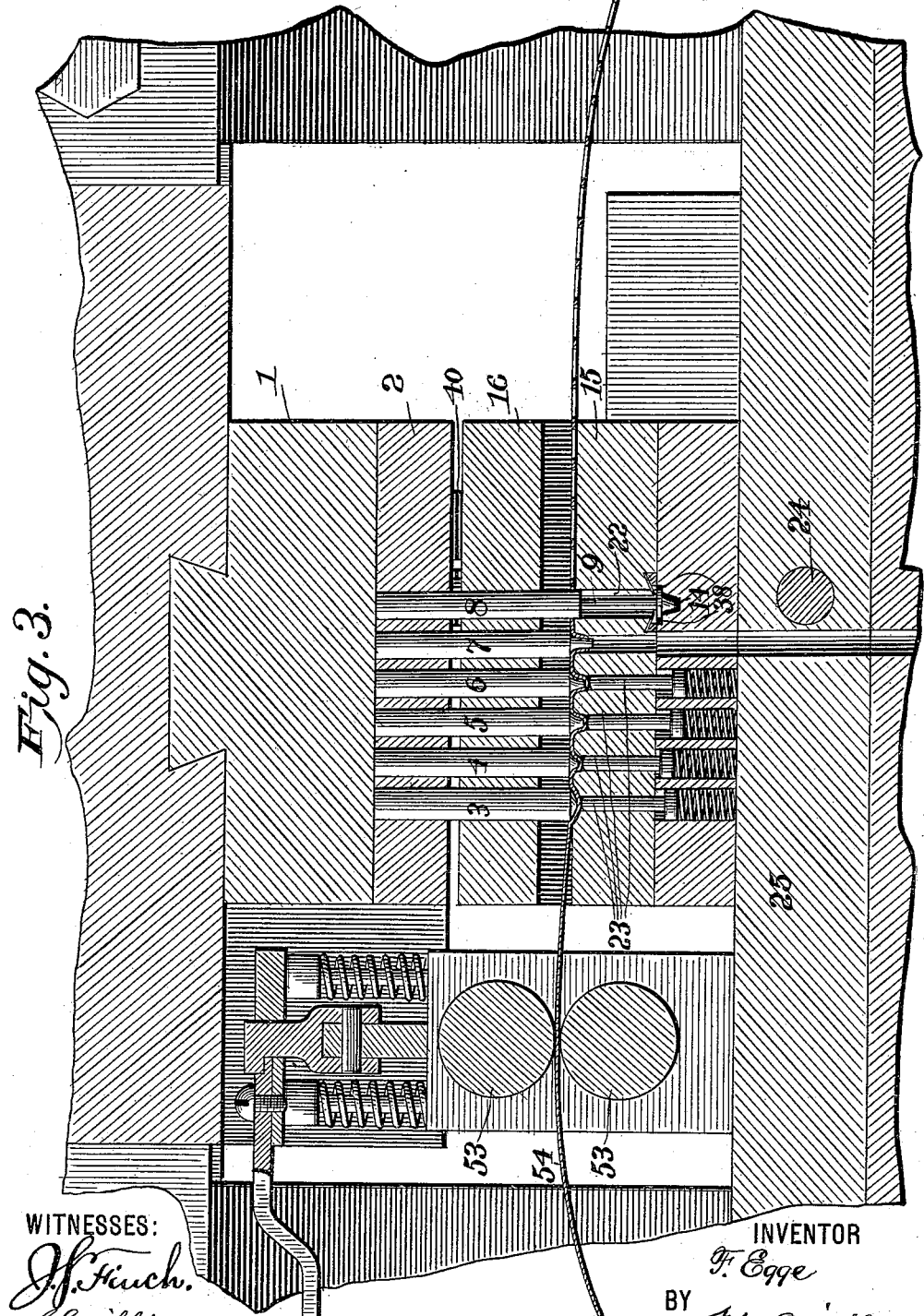

Figure 1 is a front elevation of a machine for carrying out my invention. Figs. 2 and 3 are broken vertical longitudinal sections of such machine, showing, respectively, the position of parts when the punches are in normal and operative positions. Figs. 4 and 5 are sections at the line $xx$ of Fig. 1 and showing, respectively, the position of the several parts when the punches and bender are in normal and operative positions; Fig. 6, a broken view of the punch-head, showing particularly the shape of the punches; and Fig. 7, a detail section at the line $y\,y$ of Fig. 2.

Similar numerals denote like parts in the several figures.

My invention contemplates the forming of the hooks from a strip of sheet metal continuously fed beneath the punches with a step-by-step movement, and I desire to state that in this present invention the feeding of the stock is accomplished by feed-rolls, which latter are constructed, journaled, and operated in precisely the same manner as is shown and described in Letters Patent No. 202,528, issued to me April 16, 1878, for improvement in the manufacture of sheet-metal chain. It is therefore unnecessary to describe these rolls or their operating devices, and I will simply say that they are intermittingly revolved to feed the metal strip.

1 is the gate of an ordinary power-press, and 2 the punch-head secured to said gate. Secured to said head and depending therefrom are the drawing-punches 3 4 5 6 7, which are shaped at their ends so as to draw the metal by a series of operations as said metal is fed beneath the successive punches.

8 is the punch which cuts the blank from the stock after the drawing operations have been performed, and 9 10 are follower-pins having a free movement vertically within the punch 8 and depending from a common head 11, which latter is within a cavity 12 in said punch and is backed by a spring 13, whereby said pins are normally projected. The function of these pins is to follow up the severed blank and insure the proper delivery of the same within the feed-channel 14, immediately beneath the die-block 15.

16 is the stripper, and 17, 18, 19, 20, 21, and 22 are the openings in the die-block, within which operate the respective punches 3, 4, 5, 6, 7, and 8.

23 are spring-actuated pins within the die-block and by means of which the stock is thrown out of the dies when the punches are withdrawn in order to permit the strip to feed along.

24 is a rod extending through the bed from front to rear and capable of a free sliding movement therein.

26 is a slide within suitable ways in the bed and to which the rear end of the rod 24 is secured by link 27 and nuts 28.

29 is a push-bar adapted to be reciprocated within suitable ways in the bed, the nose of said bar being capable of entering the feed-channel 14, as shown at Fig. 5. This push-bar is secured to the front end of the rod 24 by link 30 and nuts 31.

32 is a guard-finger resting on the push-bar and extending in a horizontal plane normally above the plane of the hook when the latter is within the feed-channel, the function of said finger being to prevent the hook from accidentally tilting upward as it it impelled by said bar. The normal position of said finger is slightly in advance of the end of the push-bar, so that the hook will be confined as against upward displacement before the push-bar comes in contact therewith.

33 is an elongated slot in the finger 32, and 34 is a screw passed through said slot into the push-bar.

35 is a coiled spring, secured at its ends to the screw 34 and an ear 36, projecting from the outer end of the finger. When the push-bar advances, the finger will be carried therewith until the shoulder 37 strikes against the die-block, the bar then continuing to advance, while the finger is stationary. There is no particular object in thus arresting the movement of the finger, except that I thereby obviate the necessity of enlarging the feed-channel to accommodate the finger. The feed-channel has ledges 38, on which the body of blank rests, as seen at Figs. 2, 3, and 5.

39 is a lever pivoted within a standard 40, projecting from the bed. The lower end of this lever extends loosely between posts 41, projecting from the slide 26, while a stud 42 extends laterally from the upper end and is engaged by the cam-groove 43 in an extension 44 of the press-gate. The engagement of said cam-groove and stud is a very ordinary mechanical contrivance in connection with the power-presser, and it will therefore be readily understood that as the press-gate is operated up and down the lever 39, and consequently the slide 36 and push-bar 29, will be reciprocated to and fro.

45 is the bender, which depends from the head 2 in the immediate rear of the punch 8, and 46 is the bending-block, properly shaped and located at the end of the feed-channel.

47 is a hub pivoted within the upward extension 48 of the bending-block 46. This hub has a deflecting-leg 49, which in normal position, as shown at Fig. 4, bridges over the block 46, this position being maintained by a spring 50, which acts against said leg.

51 is the hook-stripper arm, which extends laterally from the hub 47. When the bender descends, it will strike the arm 51, and thereby swing the leg 49 down, so that the said bender may operate on a hook, as shown at Fig. 5, and when the bender ascends the leg will return to normal position and the hook will be forced by the arm 51 off from the bender. As the hooks drop from the bender, they will fall on the bridge afforded by the leg 49, and thereby be deflected into the chute 52, whence they are delivered into any suitable receptacle.

53 are the rolls between and by which the strip 54 of metal is fed beneath the punches.

The lacing-hooks produced by my machine have a tubular setting-eyelet and an overhanging perforated hook-shaped head, and the operation of my improvement in making such hooks is as follows: As the metal strip is fed step by step beneath the punches, the punches 3, 4, 5, 6, and 7 will in succession perform the several operations of "drawing" the stock to form the tubular eyelets. This drawing is the result of several operations performed successively by the said punches; but the punch 7 also perforates that part of the blank which, when properly bent, constitutes the head of the hook. The punch 8 cuts out the finished blank from the metal strip, and the pins 9 10 follow the blank closely through the die-block and insure the proper deposit of the blank within the feed-channel. The push-bar now operates to drive the blank into the bending-block. The bender then descends and forms the blank into a hook, which latter is stripped from the bender during the ascent of the same and falls into the chute.

Having thus described my invention, what I claim as new, and desire to secure by Letters Patent, is—

1. In a machine for automatically making lacing-hooks which have a tubular shank and a hook-shaped head, the combination of instrumentalities for feeding a strip of metal step by step, instrumentalities carried by the gate of a power-press for forming said shank from said metal by a series of successive operations, instrumentalities for cutting out the finished blank from the metal strip, instrumentalities for delivering the blank to the bending mechanism, a bender for properly shaping the blank into the form of a hook, a bending-block to co-operate with said bender, and means for stripping the hook from the bender, substantially as set forth.

2. In a machine for automatically making lacing-hooks from a strip of sheet metal, said hooks having a tubular shank and an overhanging head, the combination of a series of punches carried by the gate of a power-press, whereby said shank is formed and the finished blank cut from the metal strip, a bending-block, a push-bar actuated from the press-gate, whereby the blank is delivered to the bending-block, a bender carried by said gate and co-operating with said block to shape the blank into the form of a hook, and a stripper for forcing the hook off from the bender, substantially as set forth.

3. The combination of the cutting-punch having depending therefrom the spring-actuated follower-pins whereby the blank is properly delivered within the feed-channel, substantially as set forth.

4. The combination of the bender, the bending-block having a feed-channel leading therein, and the reciprocatory push-bar whereby the blanks are delivered within said block, substantially as set forth.

5. The combination of the chute and the bender with the pivoted hub having extending therefrom the deflecting-leg 49 and stripper 51, substantially as set forth.

In testimony whereof I affix my signature in presence of two witnesses.

FREDERICK EGGE.

Witnesses:
F. W. SMITH, Jr.,
J. S. FINCH.